No. 882,047.
PATENTED MAR. 17, 1908.
R. BLUM.
AXLE BEARING.
APPLICATION FILED FEB. 11, 1907.
FIG_1_
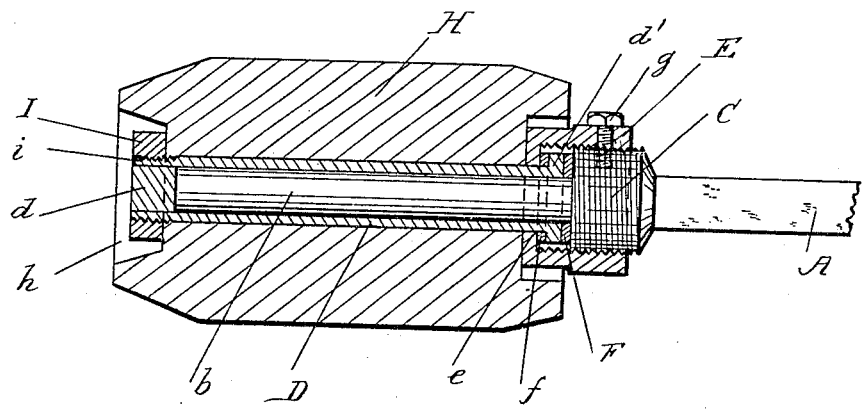
FIG_2_
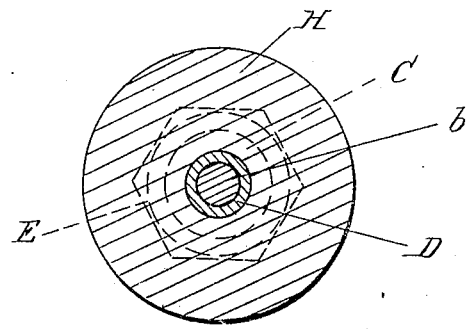
WITNESSES:
Walter Allen
Albert Popkins
INVENTOR
Robert Blum
BY
Herbert W. T. Jenner
Attorney

UNITED STATES PATENT OFFICE.

ROBERT BLUM, OF LEBANON, ILLINOIS.

AXLE-BEARING.

No. 882,047.     Specification of Letters Patent.     Patented March 17, 1908.

Application filed February 11, 1907. Serial No. 356,875.

*To all whom it may concern:*

Be it known that I, ROBERT BLUM, a citizen of the United States, residing at Lebanon in the county of St. Clair and State of Illinois, have invented certain new and useful Improvements in Axle-Bearings; and I do hereby declare the following to be a full, clear, and exact description of the invention, such as will enable others skilled in the art to which it appertains to make and use the same.

This invention relates to the axle bearings or boxes for vehicle wheels; and it consists in the novel construction and combination of the parts hereinafter fully described and claimed.

In the drawings, Figure 1 is a longitudinal section through the axle box. Fig. 2 is a cross-section through the axle box.

A is a portion of a vehicle axle, and $b$ is the axle spindle on the end of the said axle. This spindle may be cylindrical, or it may be made conical like the end portion of any approved axle.

C is a screwthreaded collar or projection between the said spindle and the main portion of the axle.

D is a bearing tube which fits over the said spindle, and which has a thrust plug $d$ at its rear end. At its front end the tube D is provided with a projecting collar $d'$.

E is a union nut which engages with the screwthreaded collar C, and which is provided with an internally projecting flange $e$ for retaining the collar $d'$.

F is a leather packing washer arranged between the collar $d'$ and the screwthreaded collar C, and $f$ is a leather packing washer arranged between the collar $d'$ and the flange $e$ of the union nut. The union nut is screwed upon the screwthreaded collar so that an oil-tight joint is formed, and it is then secured by a screw $g$ which passes transversely through one side of it into a hole in the screwthreaded collar.

H is the hub of the vehicle wheel provided at one end with a recess to receive the union nut. The bearing tube is fitted tightly into a hole in the hub, and the hub is provided with a recess $h$ at its other end for a fastening nut I which engages with a screwthreaded portion $i$ on the projecting end portion of the bearing tube. The nut I secures the wheel hub to the bearing tube, and the bearing tube is revolubly connected with the axle spindle by means of the union nut. The oil or other lubricant inserted between the bearing tube and the axle spindle cannot work out, and it is impossible for dust or dirt to penetrate into the said bearing tube.

The plug $d$ forms a thrust block for the end of the spindle $b$, and the nut I is removable and adjustable independent of the said plug. The bearing tube D fits within a smooth longitudinal hole in the hub H so that it always revolves with the said hub, but it can be adjusted longitudinally by means of the nut I. As the hub becomes worn by contact with the union nut E, and as the packing washers $f$ and F become worn, the nuts E and I are revolved and adjusted so as to take up the wear, by sliding the various parts longitudinally, and so keep the bearing oil tight.

What I claim is:

In an axle box, the combination, with a revoluble wheel hub, of a longitudinally adjustable bearing-tube in said hub provided with a collar at one end and having a thrust-block and an externally screwthreaded portion at its other end, an axle provided with a screwthreaded collar and having a spindle journaled in the said tube and bearing against the said thrust-block, a union-nut bearing against one end of the said hub and connecting the said collars, a packing washer of soft material arranged between the two said collars and preserved from rapid wear by the abutment of the said spindle against the said block, and an adjusting nut engaging with the said screwthreaded portion and operating to adjust the contact between the said revoluble hub and the normally stationary union-nut.

In testimony whereof I have affixed my signature in the presence of two witnesses.

ROBERT BLUM.

Witnesses:
HENRY RINEHARDT,
CHAS. SCHROEDER.